United States Patent
Lewczyk et al.

(10) Patent No.: US 12,473,413 B2
(45) Date of Patent: Nov. 18, 2025

(54) FOAM PRECURSOR AND FOAM WITH BIODEGRADABLE COPOLYMER AND METHODS THEREOF

(71) Applicant: Cruz Foam, Inc., Santa Cruz, CA (US)

(72) Inventors: William Thomas Lewczyk, Santa Cruz, CA (US); John Selberg, Santa Cruz, CA (US); Juan Manuel Bravo, Fairlawn, OH (US); Nicholas Cesario, Pasadena, CA (US); Maxwell Talbot, Pescadero, CA (US); Julia Ross, Santa Cruz, CA (US); Maanas Maheshwari, Saratoga, CA (US); Dylan Brown, San Diego, CA (US); Vanessa Shaffer, San Diego, CA (US)

(73) Assignee: Cruz Foam, Inc., Santa Cruz, CA (US)

( * ) Notice: Subject to any disclaimer, the term of this patent is extended or adjusted under 35 U.S.C. 154(b) by 0 days.

(21) Appl. No.: 18/920,211

(22) Filed: Oct. 18, 2024

(65) Prior Publication Data
US 2025/0129225 A1    Apr. 24, 2025

Related U.S. Application Data

(60) Provisional application No. 63/591,678, filed on Oct. 19, 2023.

(51) Int. Cl.
*C08L 3/02* (2006.01)
*C08J 9/00* (2006.01)
*C08J 9/18* (2006.01)

(52) U.S. Cl.
CPC ............ *C08J 9/0061* (2013.01); *C08J 9/18* (2013.01); *C08L 3/02* (2013.01); *C08J 2201/03* (2013.01);
(Continued)

(58) Field of Classification Search
CPC ........ C08J 9/0061; C08J 9/18; C08J 2201/03; C08J 2303/02; C08J 2467/03; C08L 3/02; C08L 2201/06; C08L 2203/14
See application file for complete search history.

(56) References Cited

U.S. PATENT DOCUMENTS

| | | |
|---|---|---|
| 8,110,380 B2 | 2/2012 | Chen et al. |
| 8,148,439 B2 | 4/2012 | Hirose et al. |

(Continued)

FOREIGN PATENT DOCUMENTS

| | | | |
|---|---|---|---|
| WO | WO-2005108475 A1 * | 11/2005 | ........... A01K 15/026 |
| WO | 2018134810 A1 | 7/2018 | |
| WO | 2023039544 A1 | 3/2023 | |

OTHER PUBLICATIONS

Hartog et al., "Erythritol is a sweet antioxidant," Nutrition, 26, (2010) 449-458. (Year: 2010).*

(Continued)

*Primary Examiner* — K. Boyle
(74) *Attorney, Agent, or Firm* — Christensen O'Connor Johnson Kindness PLLC

(57) ABSTRACT

A foam precursor, a foam, and methods for making the foam precursor and the foam is described. The foam precursor includes unmodified starch, polybutylene adipate-co-therephthalate (PBAT), and water. A PBAT weight percent representative of the PBAT included in the foam precursor is from 10% to 40%. A starch weight percent representative of the unmodified starch included in the foam precursor is greater than the PBAT weight percent. A water weight percent representative of the water included in the foam precursor is 20% or less. The PBAT weight percent is greater than the water weight percent. A density of the foam precursor is from 400 kg/m³ to 1500 kg/m³.

22 Claims, 11 Drawing Sheets

(52) U.S. Cl.
CPC ........ *C08J 2303/02* (2013.01); *C08J 2467/03* (2013.01); *C08L 2201/06* (2013.01); *C08L 2203/14* (2013.01)

(56) References Cited

U.S. PATENT DOCUMENTS

| | | |
|---|---|---|
| 10,400,105 B2 | 9/2019 | Stevens |
| 2007/0021515 A1* | 1/2007 | Glenn ..................... C08J 9/125 521/99 |
| 2009/0324913 A1 | 12/2009 | Bastioli et al. |
| 2015/0065591 A1 | 3/2015 | Liao et al. |
| 2020/0048436 A1 | 2/2020 | Chen |
| 2020/0317883 A1 | 10/2020 | Speer et al. |
| 2022/0275201 A1 | 9/2022 | Dong et al. |

OTHER PUBLICATIONS

International Search Report and Written Opinion mailed Dec. 17, 2024, issued in corresponding international Application No. PCT/US2024/052041, filed Oct. 18, 2024, 15 pages.

Chih-Jen Chang et al., "Thermoplastic Starch with Poly(butylene adipate-co-terephthalate) Blends Foamed by Supercritical Carbon Dioxide", MDPI, Polymers, May 11, 2022, pp. 1-19, Polymers 2022, 14, 1952. https://doi. org/10.3390/polym14101952, https://www.mdpi.com/journal/polymers.

Haoyu Long et al., "High-Strength Bio-Degradable Polymer Foams with Stable High vol. Expansion Ratio Using Chain Extension and Green Supercritical Mixed-Gas Foaming", MDPI, Polymers, Feb. 10, 2023, pp. 1-21, Polymers 2023, 15, 895. https://doi.org/10.3390/polym15040895, https://www.mdpi.com/journal/polymers.

* cited by examiner

FOAM PRECURSOR AND FOAM WITH BIODEGRADABLE COPOLYMER AND METHODS THEREOF

CROSS-REFERENCE TO RELATE APPLICATION

This application claims the benefit of U.S. Provisional Application No. 63/591,678 filed Oct. 19, 2023, which is hereby incorporated by reference in its entirety.

TECHNICAL FIELD

This disclosure relates generally to foam manufacturing, and in particular but not exclusively, relates to biodegradable foam precursors and foam products.

BACKGROUND INFORMATION

Plastic pollution is one of the most pressing environmental issues in modern society. Plastic objects and particles (e.g., plastic bottles, bags, containers, packaging, microbeads, and the like) may accumulate in the environment and adversely affect humans, wildlife, and their habitat. While plastics have achieved ubiquitous use aided by their inexpensive cost and durability, the sheer volume of plastic produced throughout the world results in an unsustainable amount of plastic waste being generated. Additionally, due to the durability, most plastics are resistant to many natural processes of degradation and thus persist within the environment. Plastic waste may be hazardous to life on earth as humans and animals may inadvertently ingest plastic waste and be afflicted by problems related to ingestion, animals may become physically entangled within plastics, and toxic chemicals included in many plastics may leach into water supplies that are used by humans or animals.

Plastics are commonly used in packaging materials, which are inherently wasteful by typically being one time use (e.g., to protect a product traversing being shipped from a manufacturer or retailer to a consumer) while also unlikely to be recycled, meaning most waste from packaging materials ends up in an incinerator, a landfill, or otherwise accumulates in the environment. Plastic foams (e.g., expanded polystyrene), in particular, are regularly used as packaging materials and may significantly contribute to plastic pollution. One avenue to address the ongoing crisis of plastic pollution to replace plastics with more environmentally friendly variants that are biodegradable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
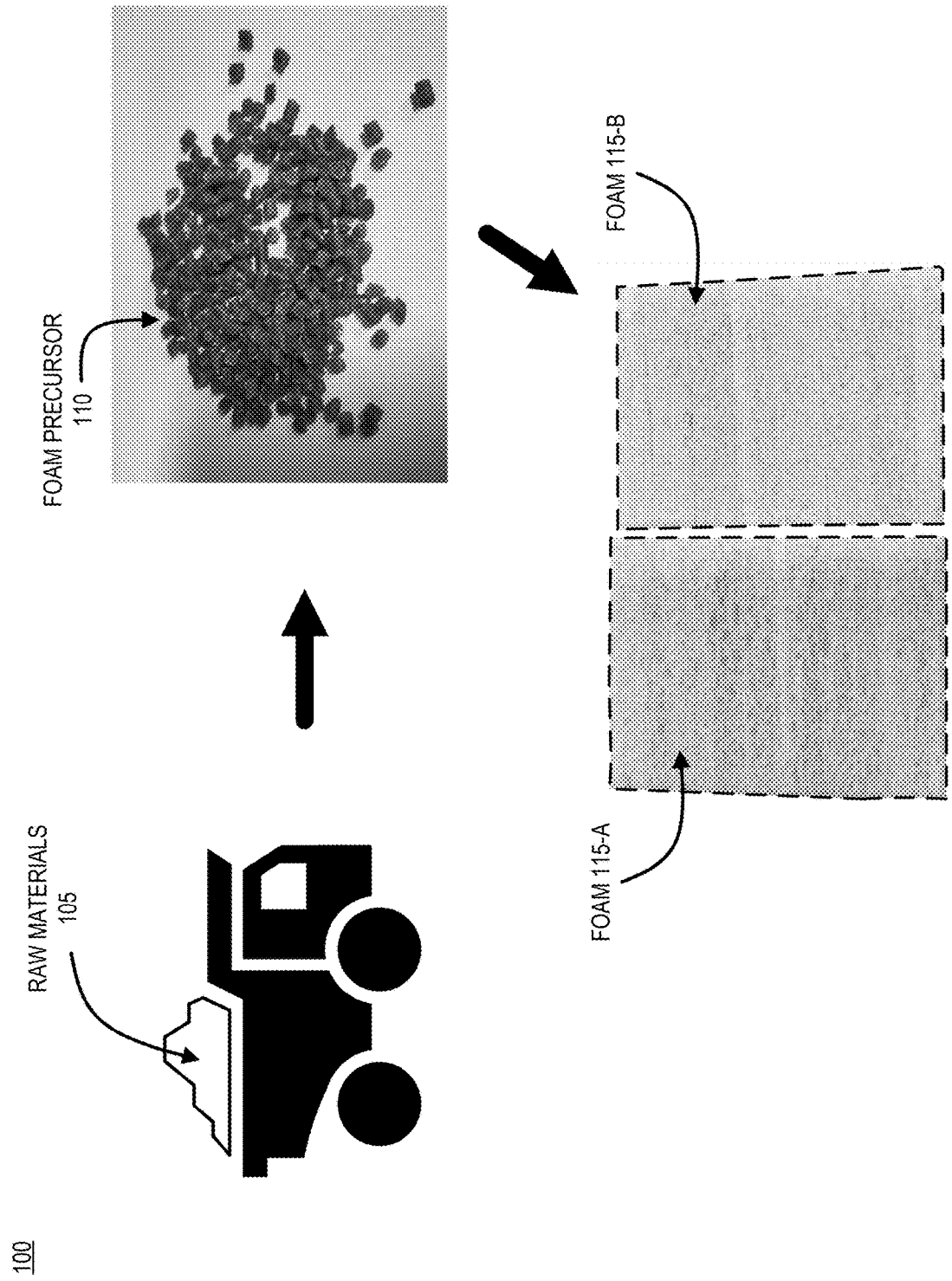
FIG. 1 illustrates a process of manufacturing a biodegradable foam by converting raw materials into a foam precursor followed by converting the foam precursor to the biodegradable foam, in accordance with embodiments of the disclosure.

Embodiments of foam precursors and foam with biodegradable copolymer and corresponding methods of manufacture are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of foam precursors and foams with biodegradable copolymer and methods thereof. In particular, a balance between mechanical performance and biodegradability has been achieved using a combination of unmodified starch and polybutylene adipateco-terephthalate (PBAT). Advantageously, the compositions and manufacturing processes described herein enable significant reduction or elimination of additives (e.g., additional materials such as plasticizers, nucleators, lubricants, other polymers, and the like may be less than 5% of the overall composition of the foam and/or foam precursor), which simplifies fabrication while simultaneously reducing cost and enhancing biodegradability. It is further appreciated that the PBAT provides additional functional benefits such as improving foam performance at low relative humidity and functioning as a plasticizer, processing aid, and viscosity modifier during foaming. For example, viscosity of a mixture including the unmodified starch and the PBAT (e.g., input into an extruder to make the foam precursor or the foam) can be adjusted based on the amount of PBAT within the mixture (or more specifically the starch/PBAT melt within the extruder). It has been found that increasing the viscosity of the starch/PBAT melt will impact the pressure drop at the die of the extruder and lead to a foam with more radial expansion (e.g., unfoamed granules of a foam precursor having a density of 400 kg/m$^3$ to 1500 kg/m$^3$ may be foamed in a second processing stage to produce a foam having a density of 10 kg/m$^3$ to 80 kg/m$^3$). It has further been found that a two-stage process where high density granules of a foam precursor are produced at elevated temperatures during a first stage and the high-density granules are foamed during a second stage at lower temperatures yields a homogeneous foam with a single-phase microstructure. It is appreciated that in some embodiments, the elevated temperatures of the first stage are 1.2 times to 1.7 times the melting temperature of PBAT, while the lower temperatures of the second stage are 0.7 times to 1.1 times the melting temperature of the PBAT.

FIG. 1 illustrates a process 100 of manufacturing a biodegradable foam by converting raw materials 105 into a foam precursor 110 followed by converting the foam precursor 110 to the biodegradable foam 115, in accordance with an embodiment of the disclosure. It is appreciated that the process 100 is a two-stage manufacturing process that will be discussed in greater detail later (see, e.g., FIGS. 3A-5B). The raw materials 105 may include unmodified starch (e.g., pea starch, corn starch, or other starches having varying combinations of amylopectin and amylose that have not been chemically modified), a biodegradable copolymer (i.e., polybutylene adipate-co-terephthalate), water, and additional materials. The additional materials may include one or more additional starches (e.g., chitin, chitosan, chitosan oligosaccharide), cellulose, one or more nucleators (e.g., calcium carbonate, talc), one or more plasticizers, (e.g., glycerol, sorbitol, urea, polyvinyl alcohol), one or more lubricants (e.g., glycerol monostearate or other similar ester lubricants, hydrogenated castor wax, glycerol distearate, and glycerol tristearate, a non-hydrogenated natural wax and metal fatty acid derivative blend such as STRUKTOL® V-Wax OP and/or ethylene glycol distearate), acetic acid, one or more processing aids (e.g., a silane-based processing aid such as STRUKTOL® TPW 813, iron oxide pigments, a silane coupling agent, a heat stabilizer, and the like). In general, it is appreciated that the additional materials are inclusive of any material included in the foam and foam precursor composition but for the unmodified starch, the biodegradable copolymer, and water.

Advantageously, embodiments described herein are capable of significantly reducing, or outright eliminating, the amount of additional materials utilized when fabricating the foam precursor 110 and/or the foam 115. For example, in some embodiments, the additional materials may account for less than 15%, less than 10%, less than 5%, less than 2.5%, or less than 1% of weight percent of the foam precursor 110 and/or the foam 115. In the same or other embodiments, the unmodified starch and the PBAT may effectively plasticize each other during processing such that traditional plasticizers (e.g., glycerol, urea, sorbitol, etc.) may be omitted entirely. For example, in some embodiments, a composition of the foam precursor 110 and/or the foam 115 may not have any other polymers (e.g., other than the unmodified starch and the PBAT). It is appreciated that the reduction in the additional materials has the advantage of simplifying processing and reducing cost while maintaining or improving foam performance through a broad range of environments (e.g., less than 10% change in compressive strength when comparing performance at 20% relative humidity to performance at 50% relative humidity). Furthermore, the water mater may facilitate gelatinization of the unmodified starch included in the foam precursor 110 and/or the foam 115 (e.g., such that the unmodified starch and the PBAT may effectively plasticize each other). Accordingly, in some embodiments the foam precursor 110 has a water weight percent representative of the water included in the foam precursor of 20% or less (e.g., from 1% to 20%, from 5%, 20%, or any interpolation therebetween) while the foam 115 has a water weight percent representative of the water included in the foam 115 is 15% or less (e.g., from 1% to 15%, from 1% to 14%, from 5% to 10%, from 6% to 10%, or any interpolation therebetween). It is appreciated that in some embodiments, if the water weight percent is outside of the above-specified ranges, the foam precursor 110 and/or the foam 115 may fail to meet performance specifications (e.g., target compressive strength, density, and the like) or otherwise fail to yield a foam or foam precursor of sufficient quality.

In some embodiments, the foam precursor 110 and/or the foam 115 may have a composition that has the following material ranges.

TABLE 1

Material Ranges for the foam precursor 110 and/or the foam 115

| Material | % of formula (w/w) |
|---|---|
| PBAT | 0-50% |
| Pea starch | 50-90% |
| Chitosan | 0-10% |
| Glycerol Monostearate | 0-5% |
| Calcium Carbonate | 0-3% |
| Talc | 0-15% |
| Urea | 0-30% |
| Glycerol | 0-30% |
| Acetic Acid | 0.1-3% |
| Water | 5-25% |

In some embodiments, the weight percent of PBAT is from 20% to 35%, the weight percent of the chitosan is from 1% to 3%, the weight percent of the pea starch is from 60% to 80%, the weight percent of the glycerol monostearate is from 0.1% to 1.0%, the weight percent of the talc is from 1% to 5%, the weight percent of the urea is from 5% to 15%, the weight percent of the glycerol is from 0% to 20%, the weight percent of the acetic acid is from 0.1% to 1%, and the weight percent of the water is from 10% to 20%.

It is appreciated that the pea starch may correspond to the unmodified starch included in the composition of the foam precursor 110 and/or the foam 115. It is further appreciated that the chitosan, glycerol monostearate, calcium carbonate, talc, urea, glycerol, and acetic acid may collectively be referred to as "additional materials" that may be included in the composition of the foam precursor 110 and/or the foam 115. In the same or other embodiments, a PBAT weight percent representative of the PBAT included in the foam is from 10% to 40%. In the same or other embodiments, a starch weight percent representative of the unmodified starch included in the foam precursor 110 and/or the foam 115 is greater than the PBAT weight percent. In the same or other embodiments, the starch weight percent is from 50% to 90%. In some embodiments, the starch weight percent and the PBAT weight percent collectively account for 85% to 100% of a composition of the foam precursor 110 and/or the foam 115. In some embodiments, the starch weight percent and the PBAT weight percent collectively account for 90% to 100% of a composition of the foam precursor 110 and/or the foam 115. In the same or other embodiments, a water weight percent representative of the water included in the foam precursor 110 and/or the foam 115 is less than each of the PBAT weight percent and the starch weight percent. In some embodiments, the starch weight percent, the PBAT weight percent, and the water weight percent collectively account for 90% to 100% of a composition of the foam precursor 110 and/or the foam 115. In the same or other embodiments, an additional materials weight percent representative of the additional materials included in the foam precursor 110 and/or the foam 115 is less than the water weight percent. In some embodiments, the additional materials weight percent is from 0% to 5% (e.g., such that the unmodified starch, the PBAT, and the water collectively represent 95% of a composition of the foam precursor 110 and/or the foam 115). As discussed previously, the additional materials correspond to any other material included in the foam precursor 110 and/or the foam 115 but for the unmodified starch, the PBAT, and the water. In some embodiments, the additional materials include at least one of a nucleator, an antioxidant, a lubricant, a plasticizer, or a processing aid. In some embodiments, a composition of the foam precursor 110 and/or the foam 115 consists essentially of the unmodified starch, the PBAT, the water, and the additional materials. In the same or other embodiments, the additional materials include at least one of polycaprolactone, polybutylene succinate, polyvinyl alcohol, glycerol monostearate, stearate-based lubricants, silicone-based lubricants, calcium carbonate, talc, glycerol, urea, sorbitol, chitosan, acetic acid, iron oxide pigments, a non-hydrogenated natural wax and metal fatty acid derivative blend, a silane coupling agent, or a heat stabilizer.

In the same or other embodiments, a composition of the foam precursor 110 and/or the foam 115 is homogeneous. In the same or other embodiments, a corresponding microstructure of the foam precursor 110 and/or the foam 115 is single phase. In the same or other embodiments, the foam precursor 110 and/or the foam 115 is non-hygroscopic and water-insoluble. The foam 115 is also characterized by one or more mechanical or structural properties. In some embodiments, the foam 115 exhibits a change of compressive strength of less than 30% after straining the foam 115 at 25% for 24 hours. In the same or other embodiments, the foam 115 exhibits environmental moisture insensitivity such that a change in compressive strength of the foam 115 between 20% relative humidity and 50% relative humidity is 10% or less. In the same or other embodiments, a compressive strength of the foam 115 at 25% strain is from 15 kPa to 25 kPa. In the same or other embodiments, the foam 115 is characterized as having a cell density of 2-5 cells per $cm^2$. In the same or other embodiments, the foam 115 is characterized as having a water contact angle between 80° and 100°. In some embodiments, the high water contact angle of the foam 115 may be maintained for several hours further attributed to the environmental moisture insensitivity of the foam 115. It is appreciated that in embodiments of the disclosure, the foam precursor 110 and the foam 115 are both solid materials at standard temperature (e.g., room temperature such as 25° C.) and pressure (e.g., 1 atm).

It is appreciated that due to the two-stage manufacturing process, the foam precursor 110 and the foam 115 have significantly different densities. In some embodiments, the foam precursor 110 has a first density from 400 $kg/m^3$ to 1500 $kg/m^3$ while the foam 115 has a second density from 10 $kg/m^3$ to 80 $kg/m^3$. In other words, the first density of the foam precursor 110 is greater than the second density of the foam 115 since the foam precursor 110 is generally considered "unfoamed" and corresponds to the output of the first stage of the two-stage manufacturing process. It is appreciated that example ranges of the first density and the second density are approximations and may have variance of up to 10%, in some embodiments. Additionally, it is appreciated that in other embodiments different ranges than those explicitly listed may be utilized depending on the target properties of the resultant foam. It is appreciated that in embodiments of the disclosure, the foam precursor 110 and the foam 115 are both solid materials at standard temperature (e.g., room temperature such as 25° C.) and pressure (e.g., 1 atm). In some embodiments, the foam precursor 110 and/or the foam 115 may have an off-white color, but it is appreciated that in other embodiments the foam precursor 110 and/or the foam 115 may be pigmented to have other colors.

In the illustrated embodiment, the foam 115 includes the foam 115-A and the foam 115-B. It is appreciated that foam 115-A and foam 115-B are compositionally the same, which correspond to pieces of foam cut and laminated with all skin removed. In some embodiments, post-fabrication processing may occur in which the foam 115-A is compressed with heat and pressure to produce the foam 115-B, which slightly collapses and consolidated the surface cell structure of the foam 115-B, relative to the foam 115-A, and may further aid in the already hydrophobic nature while providing a more uniform skin surface.

Figure 2:
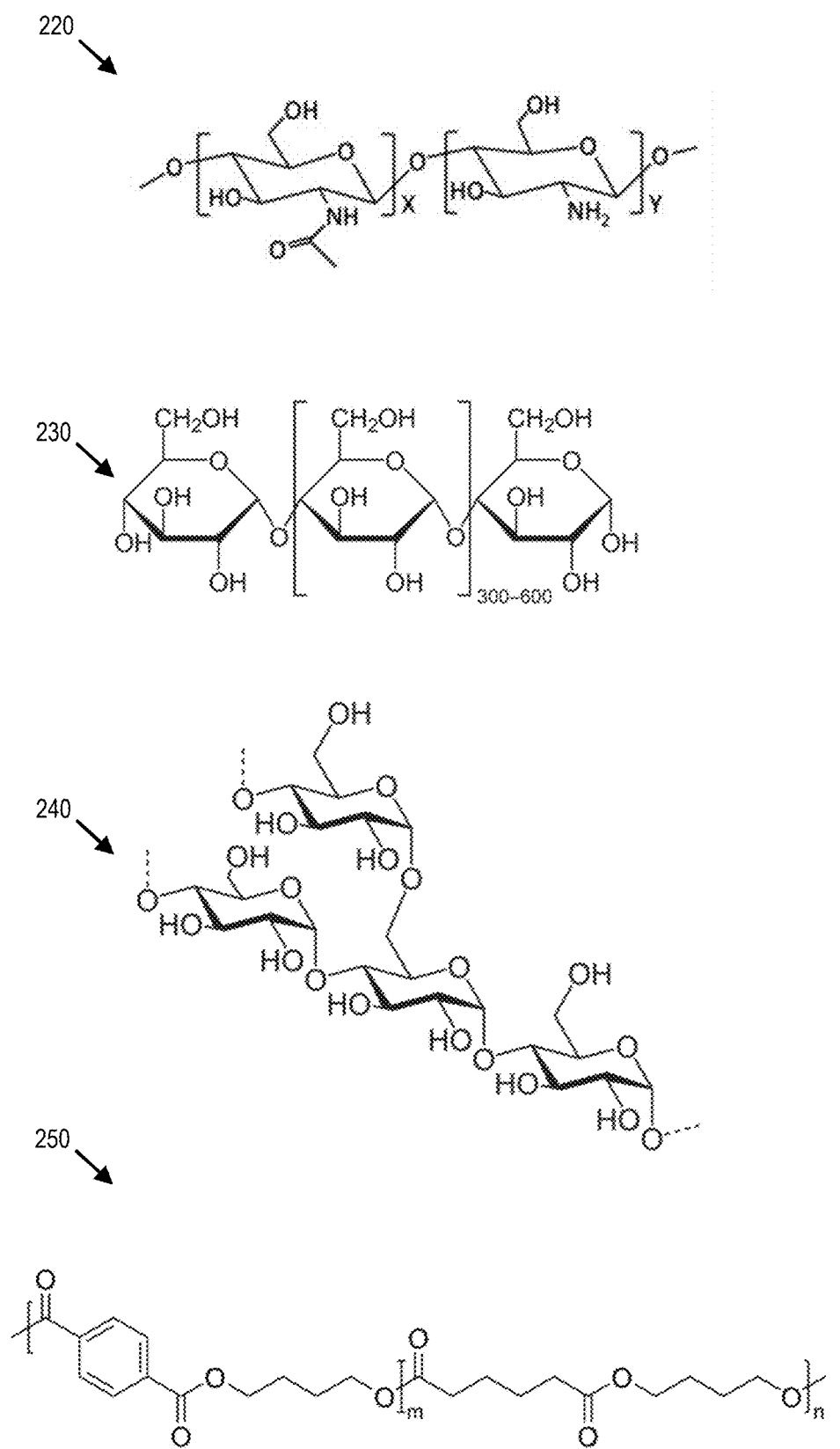
FIG. 2 illustrates chemical compositions of various ingredients that may be utilized to form a biodegradable foam, in accordance with an embodiment of the disclosure.

FIG. 2 illustrates chemical compositions of various ingredients that may be utilized to form or otherwise be included in the foam precursor 110 and/or the foam 115 illustrated in FIG. 1, in accordance with an embodiment of the present disclosure. The chemical compositions include structure 220 (i.e., a linear polysaccharide such as chitin or chitosan), structure 230 (i.e., amylose), structure 240 (i.e., amylopectin), and structure 250 (i.e., polybutylene adipate-co-terephthalate or PBAT).

It is appreciated that structure 220 corresponds to chitin or chitosan based on the degree of deacetylation (i.e., the relative amounts of X blocks with acetyl group and Y blocks with amine group) in the chain. It is appreciated that in most embodiments of the disclosure, the foam precursor and foam (e.g., the foam precursor 110 and the foam 115 illustrated in FIG. 1 or otherwise described in embodiments of the disclosure) may include chitosan due to its increased solubility in an acidic solution relative to chitin. Chitosan is defined as when a majority (i.e., greater than 50%) of the composition of structure 220 comprises the Y blocks (e.g., Y is greater than X) while chitin is defined as when a majority of the composition of structure 220 comprises X blocks (e.g., X is greater than Y). It is appreciated that chitosan is a derivative of chitin, which can be deacetylated by replacing the N-acetyl-glucosamine group with an N-glucosamine (Y block) resulting in a more hydrophilic and positively charged polymer, which can also be described as partially deacetylated chitin. When the ratio between acetyl and amine groups is higher than 1:1 (e.g., X is greater than Y), the structure 220 may be referred to as chitin. Put another way, chitosan has more than 50% N-glucosamine groups (e.g., Y blocks), whereas chitin has more than 50% N-acetyl-glucosamine groups (e.g., X blocks). Chitosan oligosaccharide has the same molecular structure as chitosan as described, just with a lower molecular weight (fewer monomer units) than the polymers of chitin or chitosan. In some embodiments, the degree of deacetylation for chitosan included in the foam precursor or foam of embodiments in the disclosure is greater than 60% (e.g., 60%-100% Y blocks of structure 220), greater than 70% (e.g., 70%-100% Y blocks of structure 220), or greater than 80% (e.g., 80%-100% Y blocks of structure 220).

In embodiments of the disclosure, unmodified starch is defined as a material made of amylose (i.e., structure 230) and amylopectin (i.e., structure 240) that has not been chemically modified. It is appreciated that different types of unmodified starches have different relative amounts of amylose (i.e., structure 230) and amylopectin (i.e., structure 240) content. For example, pea starch may have higher amylose content (e.g., 25% by weight or higher of amylose), which is greater relative to corn starch. In some embodiments, the amount of amylose included in the unmodified starch may be up to 80% depending on the variety of pea starch. It is believed that the linear structure of amylose facilitates better "flow" during processing to allow for proper plasticization and gelation provided the appropriate processing conditions are utilized during extrusion. Accordingly, in some embodiments, the unmodified starch includes an amylose content from 25% to 80%.

Structure 250 corresponds to polybutylene adipate co-terephthalate (PBAT), which is a synthetic biodegradable random copolymer that, in combination with the unmodified starch, form the majority of the composition of the foam precursor 110 and the foam 115 illustrated in FIG. 1. More specifically, PBAT is a copolyester of adipic acid, 1,4-butanediol, and terephthalic acid. PBAT provides improvements to moisture sensitivity of the foam precursor 110 and the foam 115 to facilitate the foam precursor 110 and/or the foam 115 being non-hygroscopic and water-insoluble. PBAT improves environmental moisture insensitivity of the foam precursor 110 and/or the foam 115. Additionally, it is believed that under the appropriate processing conditions discussed in embodiments herein, the PBAT is capable of compensation for the lack of (or reduction) in a plasticizer when forming the foam precursor 110 and/or the foam 115. It is believed that PBAT flows much easier than the unmodified starch and thus acts as a plasticizer/lubricant. It was found that lowering the amount of PBAT to less than 10%, by weight, of the composition of the foam precursor 110 and/or the foam 115 results in over-torquing/over-pressurizing the extruder.

Figure 3A:
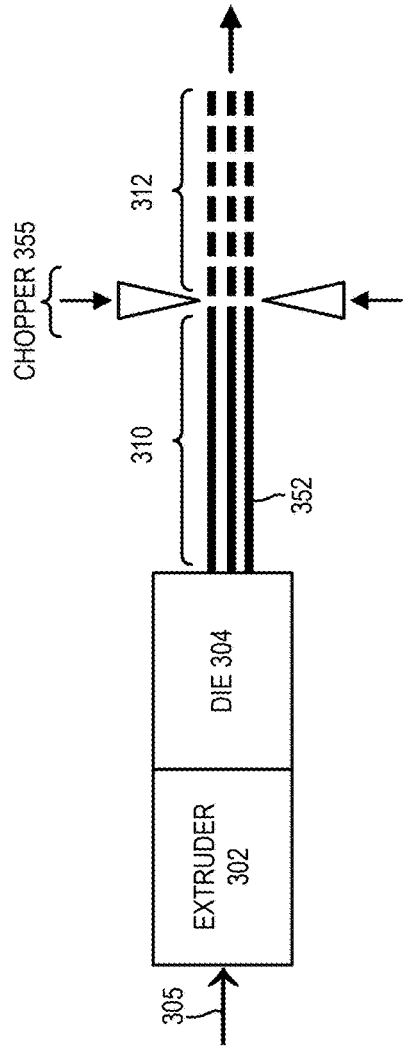
FIG. 3A illustrates an example schematic of an extruder capable of outputting an extrudate corresponding to a foam precursor or a foam that is biodegradable, in accordance with an embodiment of the disclosure.

FIG. 3A illustrates an example schematic 300 of an extruder 302 capable of outputting an extrudate 310 corresponding to a foam precursor (e.g., the foam precursor 110 illustrated in FIG. 1) or a foam (e.g., the foam 115 illustrated in FIG. 1) that is biodegradable, in accordance with an embodiment of the disclosure. More specifically, raw materials 305 (e.g., which may correspond to the raw materials 105 illustrated in FIG. 1) are input into the extruder 302 at predetermined dosing rates and locations within the extruder 302 which in turn outputs the extrudate 310 (e.g., which may correspond to the foam precursor 110 or the foam 115 illustrated in FIG. 1). In some embodiments, the extrudate 310 is cut or otherwise chopped to form a plurality of granules or pellets 312. As discussed, the extrudate 310, or more specifically the plurality of granules 312, have limited foaming to enable more efficient transportation relative to the final foam product. The plurality of granules 312 may then be reprocessed and input into the extruder 302 one or more additional times to foam the plurality of granules 312 (e.g., to produce the foam 115 illustrated in FIG. 1) as part of the two-stage manufacturing process.

In the illustrated embodiment of FIG. 3A, the plurality of granules 312 may be formed via the extruder 302, which optionally may include an extruder die 304. Extrusion is a process used to create objects by pushing material through an opening or a die of a desired cross-section shape and size. Extrusion creates excellent surface finish and gives considerable freedom of form in the design process. In some embodiments, extrusion may be continuous (e.g., theoretically producing indefinitely long material) or semi-continuous (e.g., producing many pieces). In the illustrated embodiment, the extruder 302 produces the extrudate 310, which may be a continuous or semi-continuous object.

As illustrated in FIG. 3A, raw materials 305 (e.g., solid and/or liquid input ingredients) are input into the extruder 302 in one or more inputs proximate to a first end of the extruder 302 that is opposite of a second end (e.g., an output or terminal end proximate to or otherwise formed by the die 304). The extruder 302 mixes and heats the raw materials 305 to continuously produce the extrudate 310. In some embodiments, the extruder die 304 is referred to as a "stranding die" that has many holes through which the extrudate blows to form one or more strands 352 of the extrudate 310. These strands may then be cooled and cut into smaller pieces (e.g., via the chopper 355) to produce the plurality of granules 312. It is appreciated that the plurality of granules 312 do not necessarily need to be foamed by the same extruder 302 that was used to form the plurality of granules 312. For example, in some embodiments, the plurality of granules 312 may be formed by a twin-screw extruder while the foam may be formed by foaming the plurality of granules 312 using a single-screw extruder.

Figure 3B:
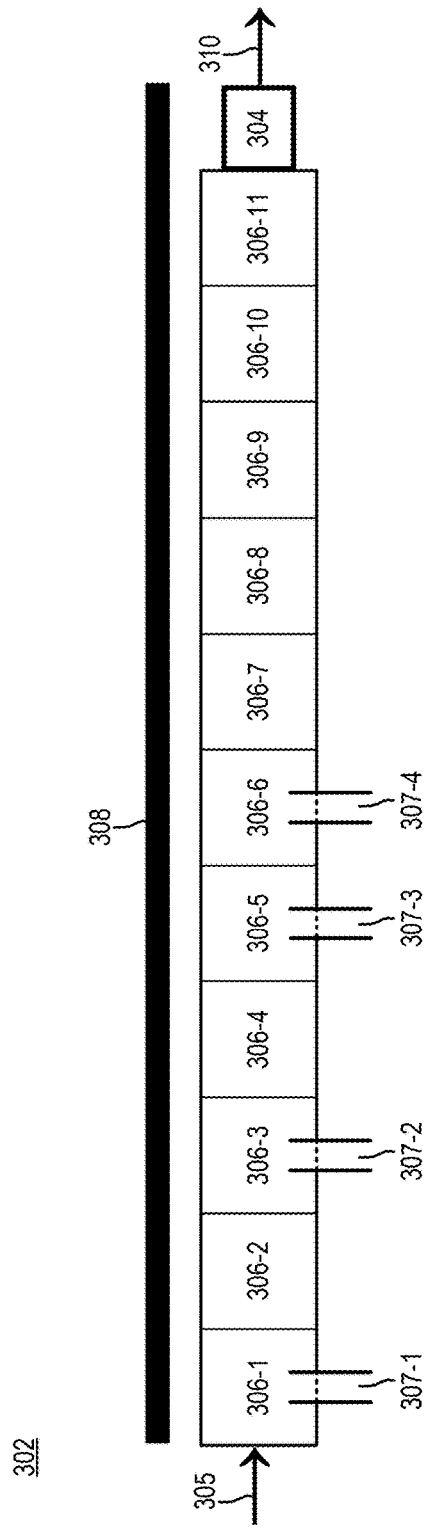
FIG. 3B illustrates a more detailed view of the extruder in the example schematic of FIG. 3A, in accordance with an embodiment of the disclosure.

FIG. 3B illustrates a more detailed view of the extruder 302 in the example schematic 300 of FIG. 3A, in accordance with embodiments of the disclosure. The extruder 302 includes a plurality of temperature-controlled zones 306 (e.g., a first zone 306-1, a second zone 306-2, a third module 306-3, a fourth zone 306-4, a fifth zone 306-5, a sixth zone 306-6, and so on until reaching an eleventh zone 306-11), which can each be configured to have a specific temperature during processing. Further, it is appreciated that the die 304 may also be similarly configured to be heated (e.g., by heater 308) such that the region associated with the die 304 may also be set to a predetermined temperature or temperature range. It is appreciated that the plurality of temperature-controlled zones 306 are not intended to be limiting as there may be more or less zones than the illustrated eleven zones (e.g., 306-1 through 306-11). Additionally, it is noted that while the plurality of temperature-controlled zones 306 are arranged in sequential order, there may be additional zones between zones that are illustrated as being adjacent, in some embodiments. For example, in one embodiment there may be one or more zones included in the plurality of temperature-controlled zones 306 between the second zone 310-2 and the third zone 310-3. In the illustrated embodiment, raw materials 305 are input into the extruder 302 for forming the extrudate 310, which flow along the extruder 302 in the direction the arrow associated the raw materials 305 until the extrudate 310 is output. (e.g., one or more components of the raw materials 305 may be input into the extruder 302 at the first zone 306-1 through input port 307-1). More specifically, the input ingredients for forming the extrudate 310 flows or otherwise propagate towards the die 304 (e.g., from a first end proximate to the first zone 306-1 towards a second end opposite the first end that is proximate to the eleventh zone 306-11). The input ingredients are subsequently mixed together at predetermined propagation profiles (e.g., rate, pressure, temperature, and the like) to form the extrudate 310.

However, it is appreciated that not all components included in the raw materials 305 are necessarily input at the same location. Rather, different ingredients may be input into the extruder 302 at different dosing rates and locations. Accordingly, the extruder 302 includes a plurality of input ports 307 (e.g., 307-1, 307-2, 307-3, and 307-4) as illustrated, but it is appreciated that additional or fewer input ports may be utilized. The plurality of input ports 307 may facilitate dosing liquid and/or solid ingredients or mixtures into the extruder 302 at different rates and locations. Additionally, one or more input ports included in the plurality of input ports 307 may be configured as a vent port to facilitate pressure control (e.g., in the case of forming the foam precursor 110 illustrated FIG. 1, a port of zone 306-9 or other zone proximate to the die 304 or the second end of the extruder 302 may be open to ambient pressure of the environment, such as 1 atm, to mitigate foaming of the foam precursor).

In some embodiments, the extruder 302 may be a twin screw extruder and the barrel (e.g., the plurality of temperature-controlled zones 306) of the extruder 302 may be heated between the first end and the second end (e.g., via heater 308). As illustrated, the mixture of components proceeds through the plurality of temperature-controlled zones 306 to form the extrudate 310, which is passed through the die 304 proximate to the second end of the extruder 302 to impart a cross sectional shape to the extrudate 310. However, it is appreciated that the die 304 is an optional component and may be omitted in some embodiments such that the terminal end of the extruder 302 (i.e., the second side) has no die or restriction through which the extrudate 310 passes.

Figure 4A:
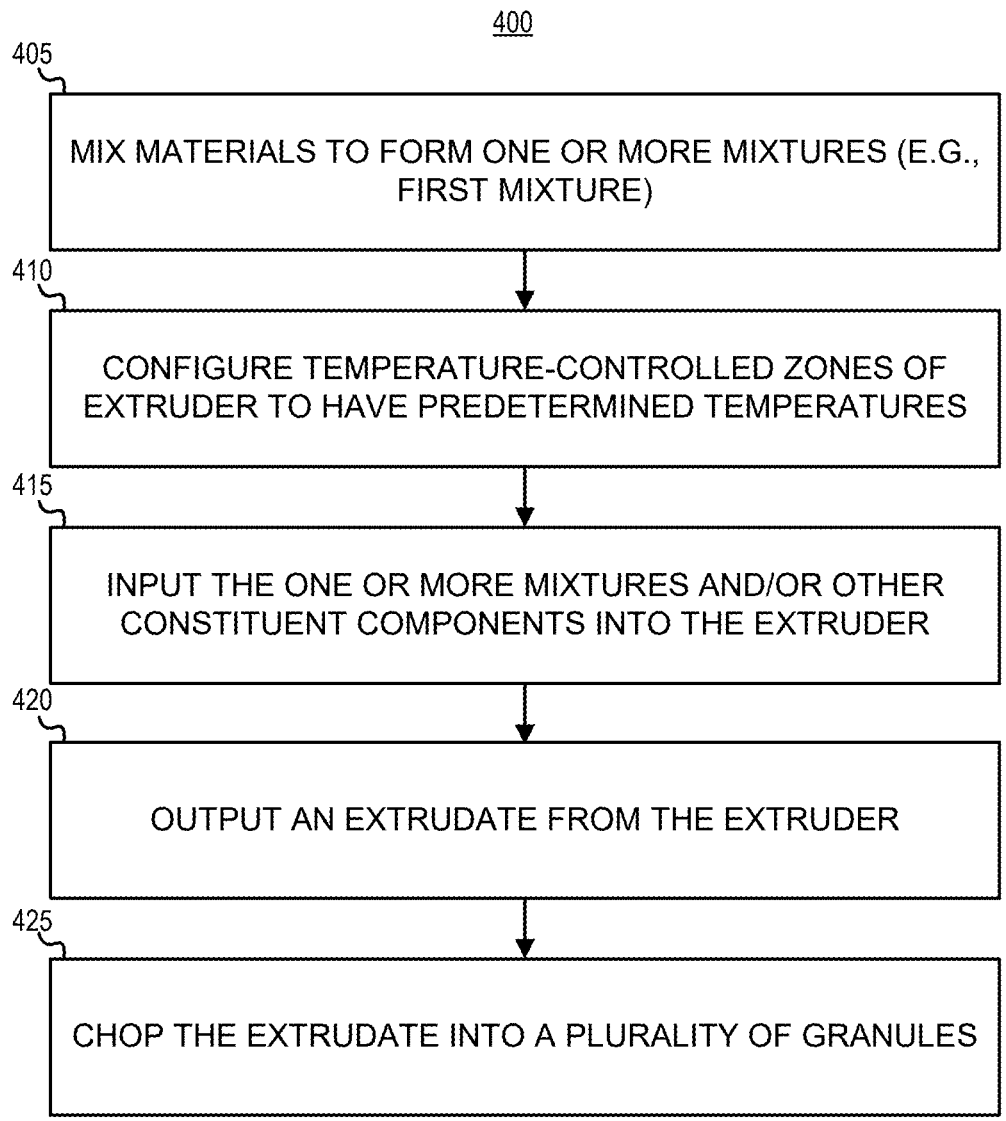
FIG. 4A illustrates an example method for fabricating a foam precursor, that is biodegradable, in accordance with an embodiment of the disclosure.

FIG. 4A illustrates an example method 400 for fabricating a foam precursor (e.g., the foam precursor 110 illustrated in FIG. 1), that is biodegradable, in accordance with an embodiment of the present disclosure. The method 400, which includes blocks 405-425, may be one possible implementation for fabricating the foam precursor 110 illustrated in FIG. 1. The order in which some or all of the process blocks appear in method 400 should not be deemed limiting. Rather, one of ordinary skill in the art having the benefit of the present disclosure will understand that some of the process blocks may be executed in a variety of orders not illustrated, or even in parallel.

Block 405 shows optionally mixing materials to form one or more mixtures before the one or more mixtures are input into an extruder (e.g., the extruder 302 illustrated in FIGS. 3A-3B). In some embodiments, solid materials are mixed before being input into the extruder. In one embodiment, the one or more mixtures includes a first mixture of solid materials. In one embodiment, unmodified starch (e.g., pea starch) and PBAT are mixed or otherwise blended together to form the first mixture. In some embodiments, a PBAT weight percent representative of the PBAT included in the first mixture is from 10% to 40%. In the same or other embodiment, the first mixture further includes additional materials. In some embodiments, the additional materials at least one of polycaprolactone, polybutylene succinate, polyvinyl alcohol, glycerol monostearate, stearate-based lubricants, silicone-based lubricants, calcium carbonate, talc, glycerol, urea, sorbitol, chitosan, acetic acid, iron oxide pigments, a non-hydrogenated natural wax and metal fatty acid derivative blend, a silane coupling agent, or a heat stabilizer. Accordingly, in some embodiments, the first mixture may include additional polymers (e.g., polycaprolactone, polybutylene succinate, polyvinyl alcohol, or the like to further modify mechanical/hygroscopic properties of the foam precursor and/or foam), lubricants (e.g., internal lubricants such as glycerol monostearate, stearates, silicones and/or external lubricants such as STRUKTOL® V-Wax OP, or the like in small amounts such as less than 1% by weight to aid in surface quality of the foam precursor and/or the foam), one or more nucleators (e.g., calcium carbonate and/or talc to nucleate the foam), one or more plasticizers (e.g., glycerol, urea, sorbitol, etc.), chitosan (when in solid form), and other materials or processing aids (e.g., a silane-based processing aid such as STRUKTOL® TPW 813, iron oxide pigments, a silane coupling agent, a heat stabilizer, and the like.

In some embodiments, an additional materials weight percent representative of the additional materials included in the first mixture is from 0% to 5%. However, in other embodiments the additional materials weight percent may be up to 15%. For example, in some embodiments, the additional materials may account for less than 15%, less than 10%, less than 5%, less than 2.5%, or less than 1% of weight percent of the foam precursor 110 and/or the foam 115 illustrated in FIG. 1.

Referring back to FIG. 4A, some embodiments, a second mixture may be included in the one or more mixtures. The second mixture may, for example, correspond to a mixture of liquid components to be input into the extruder for forming the foam precursor. For example, the second mixture may be an aqueous solution (i.e., water) that includes chitosan and an acid (e.g., acetic acid to reduce the water to a pH below 6.5 such as from 4.0 pH to 5.5 pH to dissolve the chitosan).

Figure 5A:
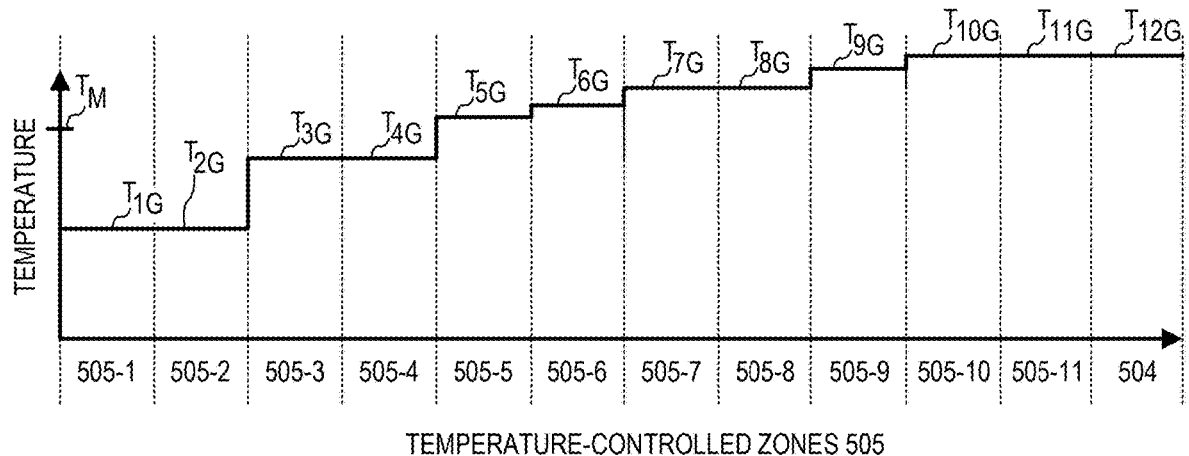
FIG. 5A illustrates an example granulation temperature profile for forming a foam precursor with an extruder having a plurality of temperature-controlled zones, in accordance with an embodiment of the disclosure.

Block 410 illustrates configuring the plurality of temperature-controlled zones of the extruder to have predetermined temperatures. Depending on the functionality (e.g., whether a foam precursor or a foam is being formed), the profile of the temperature-controlled zones may change. Accordingly, individual setpoint temperatures of the plurality of temperature-controlled zones may be configured to follow a predetermined temperature profile (see, e.g., FIG. 5A and FIG. 5B for example temperature profiles for granulation to form the foam precursor and foaming to form the foam). In some embodiments, at least an initial temperature of a proximal zone and an intermediary temperature of an intermediary zone included in the plurality of temperature-controlled zones of the extruder are configured such that the intermediary temperature is greater than the initial temperature. For example, referring to FIG. 3B, the intermediary zone is disposed between the proximal zone (e.g., zone 306-1) and the die 304 of the extruder 302. Referring to FIG. 5A, the initial temperature may correspond to $T_{1G}$ and the intermediary temperature may correspond to any other temperature (e.g., $T_{3G}$, $T_{4G}$, $T_{5G}$ and so on) of a given temperature-controlled zone that is between the proximal zone (e.g., zone 306-1 illustrated in FIG. 3B) and distal zone (e.g., zone associated with the die 304 and/or the zone 306-11 illustrated in FIG. 3B) of the extruder. In some embodiments, the intermediary temperature is configured to be from 1.2 to 1.7 times a melting temperature of PBAT (e.g., an intermediary temperature from 135° C. to 205° C.). In some embodiments, a distal temperature of a distal zone included in the plurality of temperature-controlled zones of the extruder is configured to be the same or greater than the intermediary temperature. In some embodiments, the distal zone is disposed between the die and the intermediary zone of the extruder. In other embodiments, the distal temperature of the distal zone is left unconfigured (e.g., the distal temperature is based on radiant temperature from an adjacent zone). In some embodiments, the intermediary temperature and/or the distal temperature is configured to be greater than a melting temperature of the PBAT (e.g., greater than 120° C.) while the initial temperature is configured to be less than the melting temperature of the PBAT. In some embodiments, the plurality of temperature-controlled zones is configured to correspond to the granulation temperature profile 500 illustrated in FIG. 5A.

Block 415 shows inputting the one or more mixtures (e.g., the first mixture, the second mixture, and so on) and/or other constituent components into the extruder at predetermined zones included in the plurality of temperature-controlled zones. As discussed previously, the one or more mixtures includes a first mixture of solid materials. The one or more mixtures may further include a second mixture including liquid materials. It is appreciated that the first mixture and the second mixture may be input into the extruder at the same or different zones included in the plurality of temperature-controlled zones. In some embodiments, block 415 further comprises inputting water into the extruder such that the one or more mixtures (e.g., the first mixture) is mixed with the water by the extruder. In some embodiments, individual materials may be input into the extruder (e.g., different materials may not be premixed together; for example unmodified starch and PBAT and may input into the extruder separately).

It is appreciated that once input into the extruder the one or more mixtures and/or other constituent components will be subsequently processed (e.g., further mixed or otherwise blended together based on the configuration of the extruder) by the extruder as the one or more propagates through the plurality of temperature-controlled zones of the extruder. The processing provided by the extruder is based on the configuration of the extruder, which includes at least the temperature profile of the plurality of temperature-controlled zones, screw speed, and so on. Accordingly, in some embodiments, the first mixture (and other mixtures included in the one or more mixtures) is processed within the extruder at a first temperature of 1.2 times to 1.7 times a melting temperature of the PBAT.

Block 420 illustrates outputting an extrudate (e.g., a first extrudate) corresponding to a foam precursor (e.g., the foam precursor 110 illustrated in FIG. 1). As discussed previously, in some embodiments a density (e.g., a first density) of the extrudate is from 400 kg/m³ to 1500 kg/m³. More specifically, the extrudate corresponding to the foam precursor may have the same or similar composition as discussed in reference to the foam precursor 110 illustrated in FIG. 1. For example, in some embodiments, the extrudate consists essentially of the unmodified starch, the PBAT, the water, and the additional materials. In other embodiments, the extrudate consists essentially of the unmodified starch, the PBAT, and the water.

Block 425 shows chopping the extrudate to form a plurality of granules, each granule included in the plurality of granules having a corresponding composition substantially equivalent to the foam precursor. In other words, the extrudate (i.e., the foam precursor) is cut or otherwise shaped to facilitate easier packaging (e.g., for transport), handling (e.g., for input into an extruder during the second stage of the two-stage manufacturing process), and/or processing (e.g., by an extruder for foaming). Individual granules included in the plurality of granules may correspond to a solid material having a volume of less than 1 cm³ (e.g., from 0.1 cm³ to 1 cm³). However, it is appreciated that other dimensions may be utilized, but it is noted that chopping the extrudate may facilitate foaming during a subsequent process (e.g., to convert the foam precursor to the foam in accordance with FIG. 1).

Figures 4B, 4C:
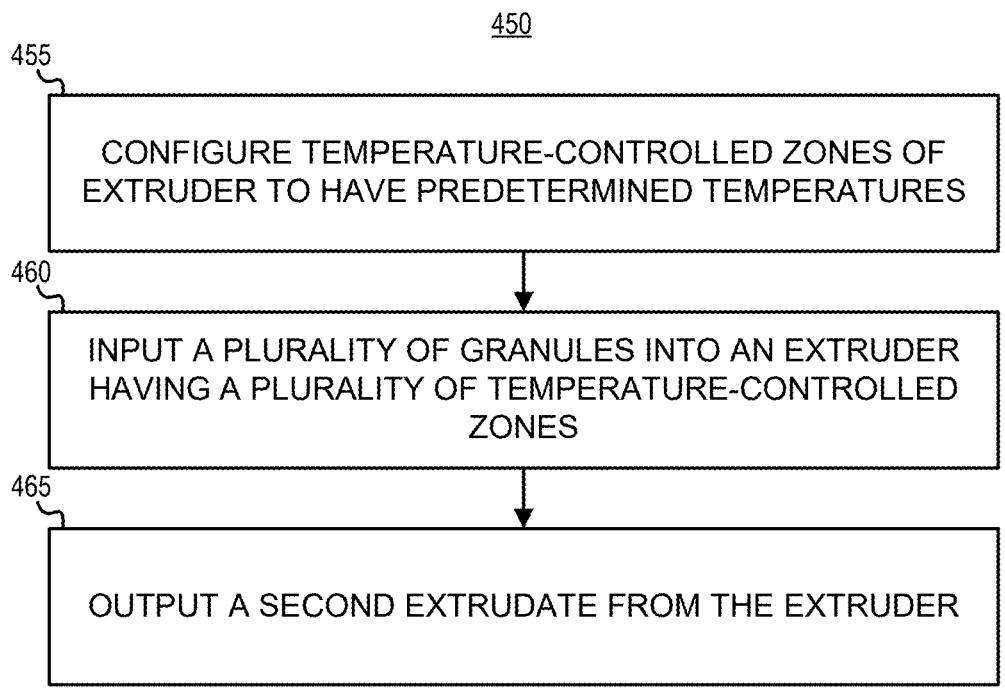
FIG. 4B illustrates an example method for fabricating a biodegradable foam from a foam precursor, in accordance with an embodiment of the disclosure.
FIG. 4C illustrates an example method for fabricating a three-dimensional shape or object using a foam precursor, in accordance with an embodiment of the disclosure.

FIG. 4B illustrates an example method 450 for fabricating a biodegradable foam (e.g., the foam 115 illustrated in FIG. 1) from a foam precursor (e.g., the foam precursor 110 illustrated in FIG. 1), in accordance with an embodiment of the disclosure. The method 450, which includes process blocks 455-460, may be one possible implementation for fabricating the foam 115 illustrated in FIG. 1. The order in which some or all of the process blocks appear in method 450 should not be deemed limiting. Rather, one of ordinary skill in the art having the benefit of the present disclosure will understand that some of the process blocks may be executed in a variety of orders not illustrated, or even in parallel. It is further appreciated that the method 450 may be used in combination with method 400 illustrated in FIG. 4A to convert the plurality of granules (e.g., the foam precursor) to the foam. It is appreciated that the same extruder may be utilized by both methods 400 and 450. Alternatively, different extruders at different locations may be utilized.

Figure 5B:
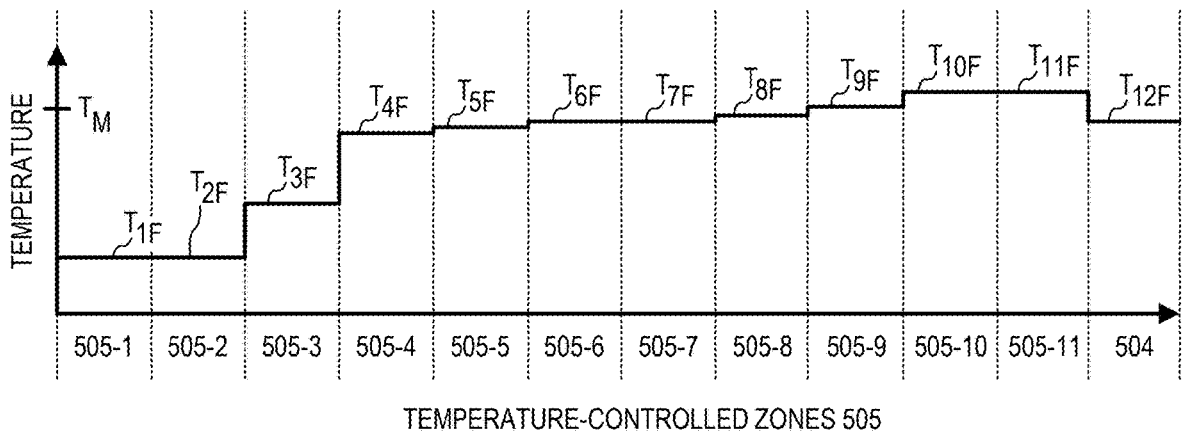
FIG. 5B illustrates an example foaming temperature profile to foam a foam precursor with an extruder to form a foam that is biodegradable, in accordance with an embodiment of the disclosure.

Block 455 shows configuring a plurality of temperature-controlled zones of an extruder to have predetermined temperatures (see, e.g., FIG. 5B). It is appreciated that the plurality of temperature-controlled zones may be configured to initially be approximate to room temperature or otherwise unconfigured (e.g., $T_{1F}$ of FIG. 5B) and then ramped or stepped to a peak or melt temperature (e.g., $T_{11F}$ of FIG. 5B) before dropping down to a lower temperature (e.g., $T_{12F}$ of FIG. 5B). In some embodiments, the plurality of temperature-controlled zones may be configured to reach at least 200 psi (e.g., vent port is not open) during and specific mechanical energy is at least 0.125 to 0.175 kWh/kg during processing to facilitate foaming of the plurality of granules. Accordingly, it is appreciated when forming the foam precursor the pressure within the extruder may be less than the pressure within the extruder when forming the foam in some embodiments.

Block 460 illustrates inputting the plurality of granules (e.g., the foam precursor) into an extruder having a plurality of temperature-controlled zones to foam the plurality of granules. It is appreciated that as the plurality of granules propagate through the extruder, the extruder blends the plurality of granules together based on the configuration of the extruder (e.g., foaming temperature profile, screw speed, and so on). In some embodiments, the plurality of granules is processed by the extruder at a second temperature (e.g., peak temperature configuration of the foaming temperature profile 550 illustrated in FIG. 5B), which is less than the first temperature (e.g., peak temperature configuration of the granulation temperature profile 500 illustrated in FIG. 5A). In other words, the peak foaming temperature is less than the peak granulating temperature. In some embodiments, the first temperature is 1.2 times to 1.7 times the melting temperature of the PBAT while the second temperature is from 0.7 to 1.1 times the melting temperature of the PBAT.

Figure 9:
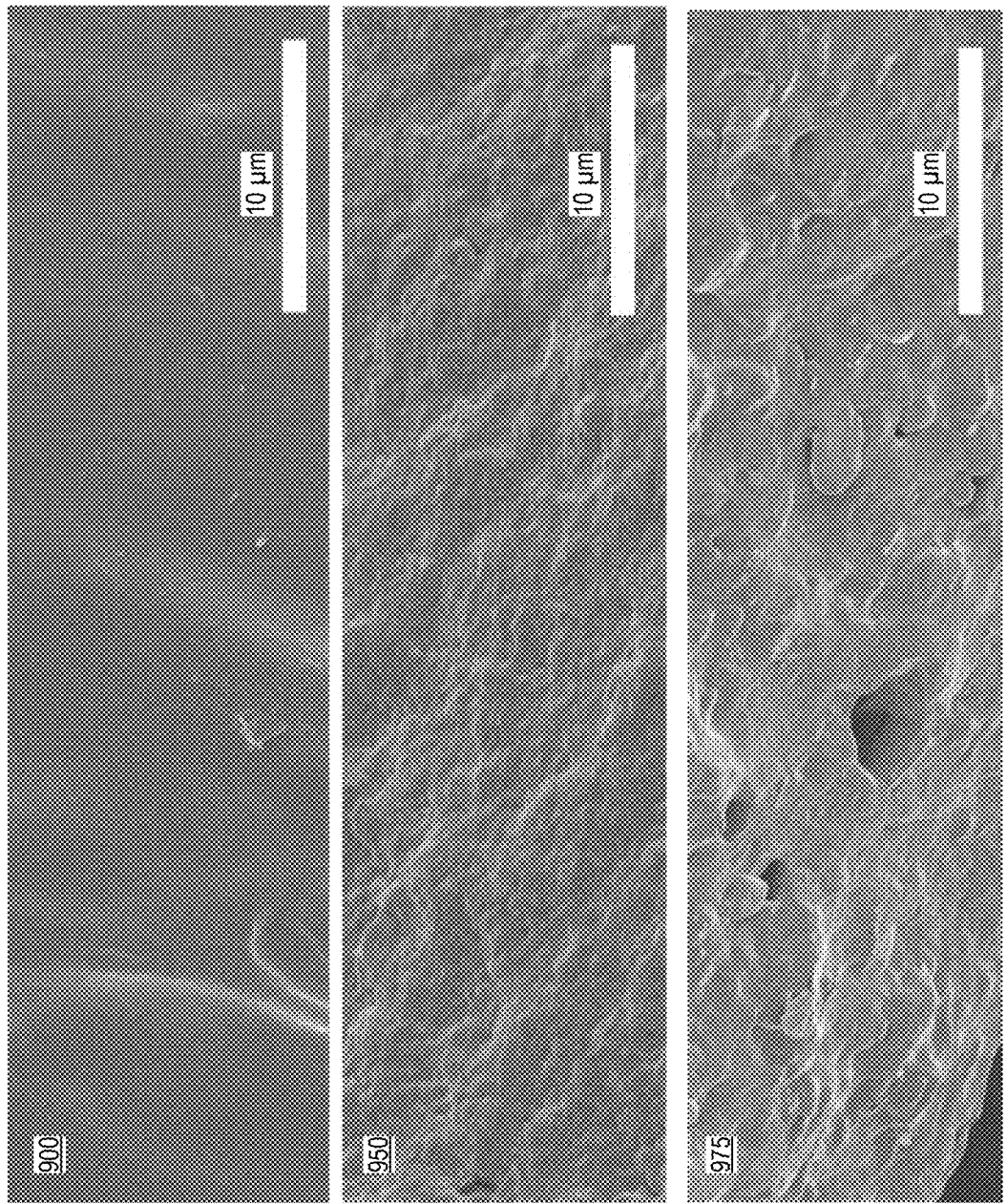
FIG. 9 illustrates scanning electron microscope images of example foams, in accordance with embodiments of the disclosure.

In some embodiments, other components may be input into the extruder when foaming the plurality of granules. In some embodiments, the other components include water. In the same or other embodiments, the other components include PBAT (e.g., for additional loading of PBAT). In one embodiment, the plurality of granules does not include PBAT prior to foaming. Instead, in some embodiments, PBAT is introduced at the second stage of the two-stage manufacturing process. However, it was found that PBAT loading at the second stage of the manufacturing process may result in a foam with reduced compressive strength and less homogeneity (see, e.g., scanning electron microscope image 950 illustrated in FIG. 9 compared to scanning electron microscope image 900 illustrated in FIG. 9).

Block 465 illustrates outputting the plurality of granules (and optionally other components) that have been processed by the extruder during the second stage of the two-stage manufacturing process as a second extrudate from the extruder, the second extrudate corresponding to a foam (e.g., the foam 115 illustrated in FIG. 1). In most embodiments, the plurality of granules has a first density and the foam has a second density less than the first density. In other words, the plurality of granules are foams to produce a less dense foam. In some embodiments, the first density is from 400 kg/m$^3$ to 1500 kg/m$^3$ while the second density is from 10 kg/m$^3$ to 80 kg/m$^3$.

FIG. 4C illustrates an example method 470 for fabricating a three-dimensional shape using a foam precursor (e.g., the foam precursor 110 illustrated in FIG. 1), in accordance with an embodiment of the disclosure. The method 470, which includes process blocks 475-480, may be one possible implementation for fabricating the foam 115 illustrated in FIG. 1 or other three-dimensional shape from a foam precursor (e.g., the foam precursor 110 illustrated in FIG. 1). The order in which some or all of the process blocks appear in method 470 should not be deemed limiting. Rather, one of ordinary skill in the art having the benefit of the present disclosure will understand that some of the process blocks may be executed in a variety of orders not illustrated, or even in parallel. It is further appreciated that the method 470 may be used in combination with method 400 illustrated in FIG. 4A to convert the plurality of granules (e.g., the foam precursor) to the foam or other three-dimensional shape. It is appreciated that an injection molder may be used by method 750 to form the three-dimensional shape, which may be located at the same or a different location as the extruder utilized in the method 400 of FIG. 4A.

Block 475 illustrates heating and/or mixing a plurality of granules (e.g., the foam precursor 110 illustrated in FIG. 1) to form molten material, which may be used to make three-dimensional shapes. More specifically, the plurality of granules may be put into an injection molder to be reformed into a three-dimensional shape to product a foamed or unfoamed object. In block 475 the plurality of granules is heated to reform the plurality of granules. However, in the same or other embodiments, the plurality of granules may be reformed using at least one of heat, pressure, solvents, or combinations thereof. In some embodiments, additional ingredients such as foaming agents (e.g., acids, bases, water, or the like) may be added to the injection molder or an air puffer to foam the plurality of granules and create a three-dimensional foam shape. In other embodiments, water may be used as a primary foaming agent (e.g., water already present in the plurality of granules or subsequently added into the injection molder).

Block 480 shows inputting the molten material into a mold having an inner cavity corresponding to a target three-dimensional shape. It is appreciated that the molten material may fill the inner cavity of the mold such that the molten material forms an object having a shape corresponding to the target three-dimensional shape.

Block 485 illustrates allowing the molten material to cool and form an object having a three-dimensional shape corresponding to the shape of the inner cavity. Once sufficiently cooled to be removed from the mold without damage, the cooled molten material (i.e., the object having the three-dimensional shape is removed from the mold. In some embodiments, the object has a three-dimensional shape of one or more products that includes at least one of a food packing material, an insulating packaging material, a cold-chain packing material, an equipment packing material, an appliance packaging material, or more generally a packaging material.

Accordingly, methods 400, 450, and/or 470 may be utilized to form a product from a plurality of granules (e.g., the foam precursor 110 illustrated in FIG. 1) by blending the plurality of granules together and extruding, air puffing, or injection molding the plurality of granules to form a three-dimensional shape corresponding to the product. In some embodiments, the plurality of granules include an unmodified starch, polybutylene adipate-co-therephthalate (PBAT), and water. In the same or other embodiments, a PBAT weight percent representative of the PBAT included in the product is from 10% to 40%, a starch weight percent representative of the unmodified starch included in the product is greater than the PBAT weight percent, a water weight percent representative of the water included in the product is 20% or less, the PBAT weight percent is greater than the water weight percent, and/or a density of the product is from 10 kg/m$^3$ to 1500 kg/m$^3$.

FIG. 5A illustrates an example granulation temperature profile 500 for forming a foam precursor (e.g., the foam precursor 110 illustrated in FIG. 1) with an extruder having a plurality of temperature-controlled zones, in accordance with an embodiment of the disclosure. Specifically, the example granulation temperature profile 500 may be implemented with extruder 302 illustrated in FIGS. 3A-3B when performing the method 400 illustrated in FIG. 4A, in accordance with an embodiment of the disclosure. The example granulation temperature profile 500 illustrates temperature (e.g., ° C.) with respect to temperature-controlled zones 505 (e.g., zones 505-1 through 505-11 and zone 504 corresponding to the die of the extruder). In some embodiments, the temperature-controlled zones 505 may correspond to the plurality of temperature-controlled zones 306 illustrated in FIG. 3B (e.g., 506-1 corresponds to 306-1, 506-2 corresponds to 306-2, and so on), which may be used to infer relative temperature with respect to zones materials are input, vent port open, and the like.

Additionally, it is noted that the relative relationship between the temperature set points (e.g., $T_{1G}$ through $T_{12G}$) for the granulation temperature profile 500 and the melting temperature $T_M$ of the PBAT may be inferred. For example, $T_{1G}$-$T_{4G}$ may be less than the melting temperature $T_M$ of the PBAT while $T_{5G}$ through $T_{12G}$ may be more (e.g., up to 1.2 times to 1.7 times in magnitude). Generally, it is appreciated that $T_{1G}$-$T_{4G}$ may range from 25° C. to 95° C. while $T_{5G}$ through $T_{12G}$ may range from 120° C. to 205° C. As illustrated in the temperature granulate profile 500, the temperature of the plurality of temperature-controlled zones of the extruder is gradually increases from the first side (e.g., input or proximal side of the extruder) to the second side (e.g., output or distal side of the extruder) until reaching a peak temperature (e.g., up to 205° C.), which corresponds to the elevated temperature of the first stage of the two-stage manufacturing process.

In some embodiments, the peak temperature configured for at least one of the plurality of temperature-controlled zones 505 when forming the foam precursor (e.g., the foam precursor 110 illustrated in FIG. 1) is from 1.2 times to 1.7 times, from 1.3 times to 1.7 times, from 1.4 times to 1.7 times, from 1.5 times to 1.7 times, from 1.6 times to 1.7 times, from 1.2 times to 1.6 times, from 1.2 times to 1.5 times, from 1.2 times to 1.4 times, or from 1.2 times to 1.3 times the melting temperature $T_M$ of the PBAT.

FIG. 5B illustrates an example foaming temperature profile 550 to foam a foam precursor (e.g., the foam precursor 110 illustrated in FIG. 1) with an extruder to form a foam (e.g., the foam 115 illustrated in FIG. 1) that is biodegradable, in accordance with an embodiment of the disclosure. Specifically, the example foaming temperature profile 550 may be implemented with extruder 302 illustrated in FIGS. 3A-3B when performing the method 450 illustrated in FIG. 4B, in accordance with an embodiment of the disclosure. The example foaming temperature profile 550 illustrates temperature (e.g., ° C.) with respect to temperature-controlled zones 505 (e.g., zones 505-1 through 505-11 and zone 504 corresponding to the die of the extruder). In some embodiments, the temperature-controlled zones 505 may correspond to the plurality of temperature-controlled zones 306 illustrated in FIG. 3B (e.g., 506-1 corresponds to 306-1, 506-2 corresponds to 306-2, and so on), which may be used to infer relative temperature with respect to zones materials are input, vent port open, and the like.

Additionally, it is noted that the relative relationship between the temperature set points (e.g., $T_{1F}$ through $T_{12F}$) for the foaming temperature profile 500 and the melting temperature $T_M$ of the PBAT may be inferred. For example, $T_{1F}$-$T_{5F}$ may be less than the melting temperature $T_M$ of the PBAT while $T_{6F}$ through $T_{12F}$ may be approximate to or otherwise correspond to the melting temperature $T_M$ of the PBAT to the melting (e.g., up to 0.7 times to 1.1 times in magnitude). Generally, it is appreciated that $T_{1G}$-$T_{4G}$ may range from 25° C. to 110° C. while $T_{6F}$ through $T_{12F}$ may range from 95° C. to 140° C. As illustrated in the temperature granulate profile 550, the temperature of the plurality of temperature-controlled zones of the extruder is gradually increases from the first side (e.g., input or proximal side of the extruder) to the second side (e.g., output or distal side of the extruder) until reaching a peak temperature (e.g., up to 140° C.), which corresponds to the elevated temperature of the second stage of the two-stage manufacturing process at $T_{11F}$, which is then reduced to $T_{12F}$ (e.g., from 25° C. to proximate $T_M$). In some embodiments, $T_{1F}$ and $T_{2F}$ correspond to a null set point or room temperature (e.g., ambient temperature such as 25° C.), which is then gradually increased to the peak foaming temperature. As can be seen, the granulation temperature profile 500 and the foaming temperature profile 550 are quite different due to their different functions. For example, the granulation temperature profile 500 intends to minimize foaming while the foaming temperature profile 550 intends to maximize foaming.

In some embodiments, the peak temperature configured for at least one of the plurality of temperature-controlled zones 505 when forming the foam (e.g., the foam 115 illustrated in FIG. 1) is from 0.7 times to 1.1 times, from 0.7 times to 1.0 times, from 0.7 times to 0.9 times, from 0.7 times to 0.8 times, from 0.8 times to 1.1 times, from 0.9 times to 1.1 times, or from 1.0 times to 1.1 times the melting temperature $T_M$ of the PBAT.

Figure 6:
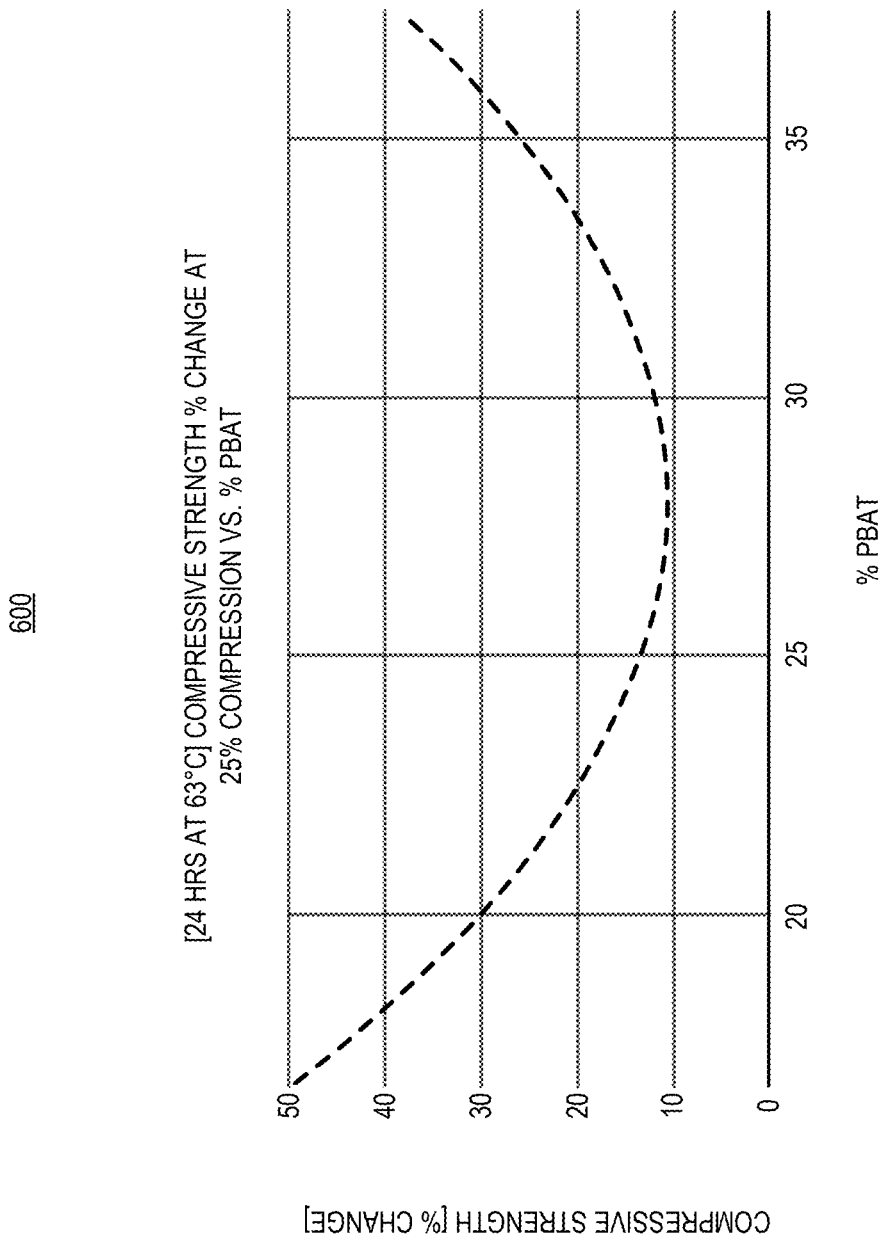
FIG. 6 illustrates a chart showing compressive strength change of example foams with different amounts of polybutylene adipate-co-terephthalate, in accordance with embodiments of the disclosure.

FIG. 6 illustrates a chart 600 showing compressive strength change of example foams with different amounts of polybutylene adipate-co-terephthalate (PBAT), in accordance with embodiments of the disclosure. The example foams characterized in the chart 600 correspond to possible implementations of the foam 115 illustrated in FIG. 1 and other embodiments of the disclosure. In other words, the chart 600 is representative of the foam 115 illustrated in FIG. 1. As discussed previously, PBAT loading may be varied from 0% to 50%, but it was found that to maintain a compressive strength change below 30% (e.g., which may be necessary for the foam to have sufficient characteristics to be utilized as a packaging material), then PBAT loading should be limited from 20% to 35% of a composition, by weight, of the foam. As illustrated in chart 600, foams having a composition, by weight percent, of PBAT between 20% and 35% have a change in compressive strength of less than 30%. It is appreciated that the compressive strength was measured at 25% strain after conditioning the foam for 24 hours at 63° C.

Figure 7:
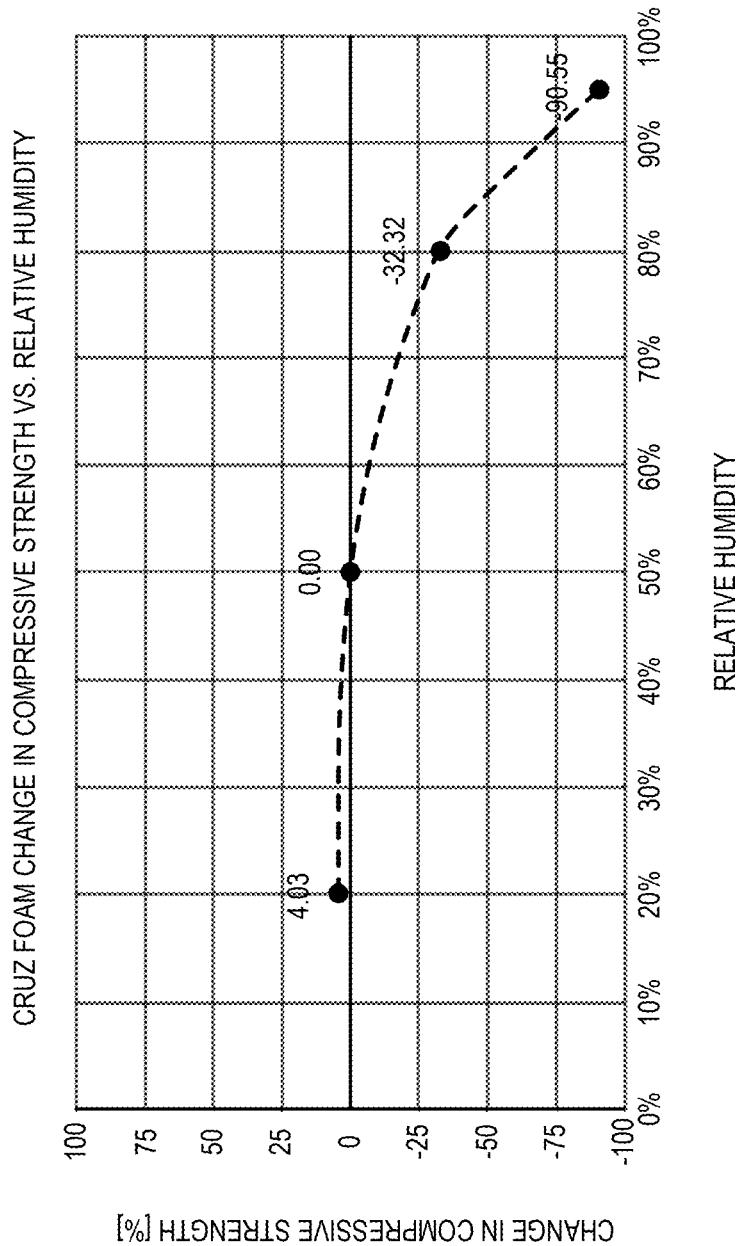
FIG. 7 illustrates a chart showing compressive strength change of example foams with respect to relative humidity, in accordance with embodiments of the disclosure.

FIG. 7 illustrates a chart 700 showing compressive strength change of example foams with respect to relative humidity, in accordance with embodiments of the disclosure. The example foam characterized in the chart 700 corresponds to possible implementations of the foam 115 illustrated in FIG. 1 and other embodiments of the disclosure. In other words, the chart 700 is representative of the foam 115 illustrated in FIG. 1. As illustrated, the change in compressive strength of the foam is less than 10% when comparing compressive strength at 20% relative humidity and 50% relative humidity. In other words, the foam exhibits environmental moisture insensitivity such that a change of compressive strength of the foam between 20% relative humidity and 50% relative humidity is 10% or less.

Figure 8:
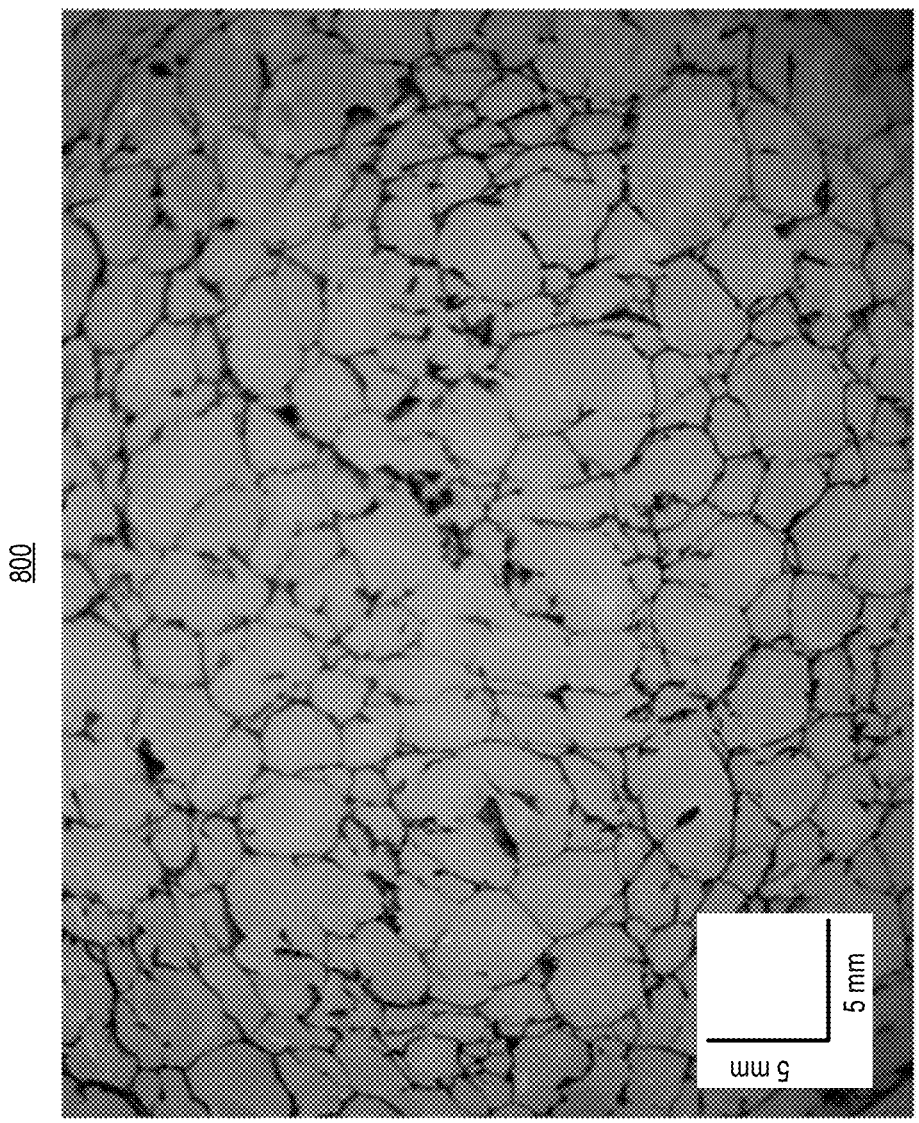
FIG. 8 illustrates a cross-sectional view of an example foam, in accordance with an embodiment of the disclosure.

FIG. 8 illustrates a cross-sectional view 800 of an example foam, in accordance with an embodiment of the disclosure. The example foam characterized in the chart 800 corresponds to possible implementations of the foam 115 illustrated in FIG. 1 and other embodiments of the disclosure. In other words, the chart 700 is representative of the foam 115 illustrated in FIG. 1. As illustrated, the foam illustrated in FIG. 8 has been stained (e.g., dyed or pigmented) to better elucidate the cell size or density. In the illustrated embodiment, the foam is characterized as having a cell density, on average, of 2-40 cells per $cm^2$. In some embodiments, the foam is characterized as having a cell density of 2-5 cells per $cm^2$, 10-30 cells per $cm^2$, 15-25 cells per $cm^2$, or any interpolation between 2-40 cells per $cm^2$.

FIG. 9 illustrates scanning electron microscope (SEM) images 900, 950, and 975 of example foams, in accordance with embodiments of the present disclosure. Specifically, three different foams are compared. SEM image 900 is representative of the foam 115 illustrated in FIG. 1. Specifically, the foam illustrated by SEM image 900 may have a PBAT weight percent from 20% to 35% and a starch weight percent (e.g., representative of unmodified pea starch included in the foam) from 60% to 80% that has utilized the two-stage manufacturing process to homogenize the composition (i.e., the first mixture during the first stage includes both the unmodified starch and the PBAT). SEM image 950 is representative of a foam having the same composition as the foam represented by SEM image 900, but PBAT was not included in the first stage of manufacturing. Rather, the foam SEM 950 is representative of had PBAT input during the second stage of the two-stage manufacturing (e.g., during the foaming process, which is at a lower temperature). As illustrated, the foam represented by the SEM image 900 has a much more homogeneous and single-phase microstructure whereas the foam represented by the SEM image 950 is less homogeneous, which has a detrimental effect on the mechanical properties. It is further noted that the foam represented by the SEM image 900 had low amounts of lubricants and/or plasticizers (e.g., additional materials are less than 3% of total composition, by weight), whereas the foam represented by the SEM 950 has higher amounts of plasticizer/lubricant. The SEM image 975 is representative of a foam that does not include PBAT and has a significantly less homogeneous structure and/or multi-phase morphology.

Figure 10:
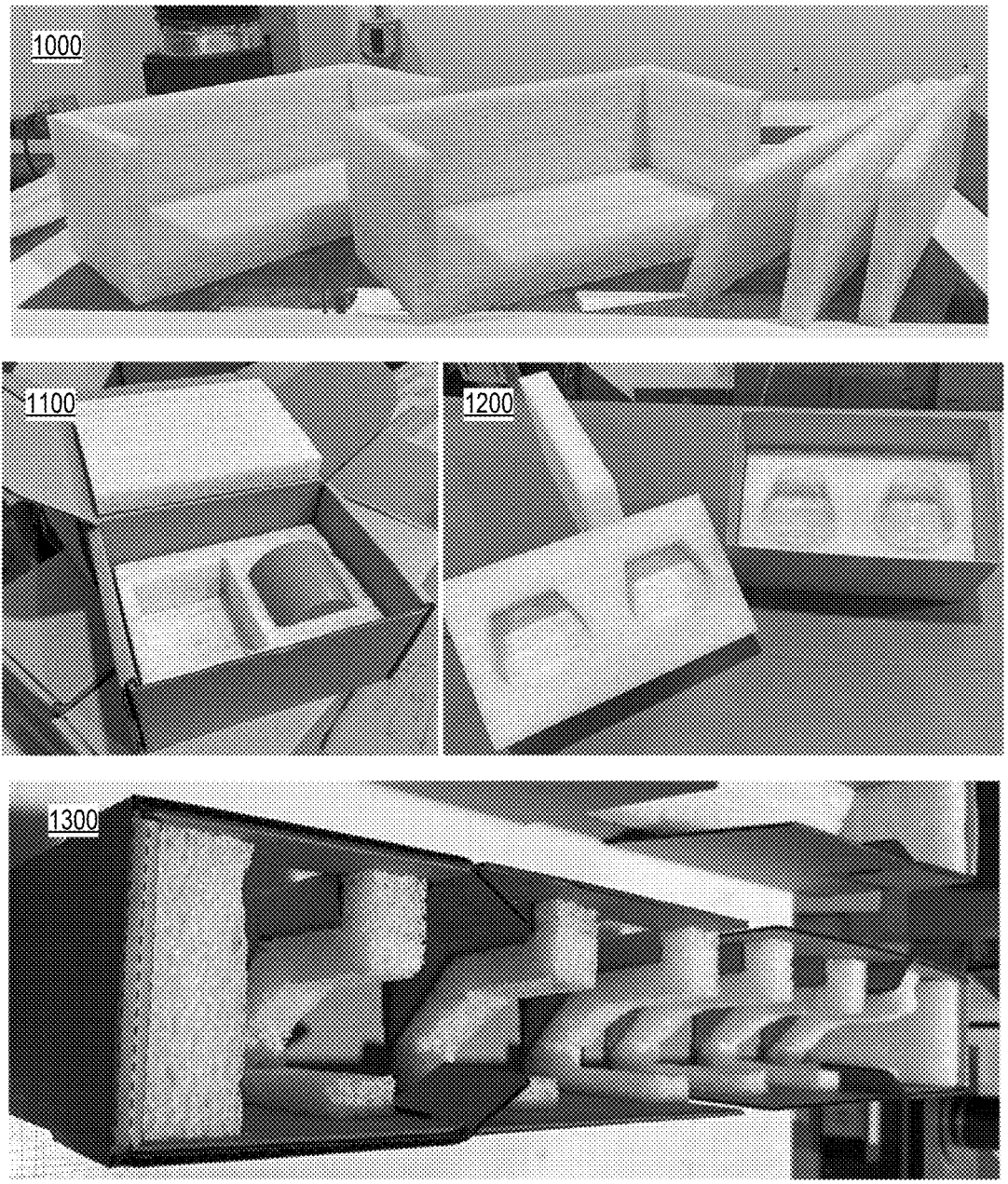
FIG. 10 illustrates example foam products, in accordance with embodiments of the disclosure.

FIG. 10 illustrates example foam products 1000, 1100, 1200, and 1300, in accordance with embodiments of the present disclosure. The example foam products 1000, 1100, 1200, and 1300 may be fabricated by the foam 115 illustrated in FIG. 1 and other embodiments of the foam discussed throughout the disclosure. Specifically, the foam may be cut and laminated together into sheets and then die cut and stacked to form the example foam products 1000, 1100, 1200, and 1300. It is noted that the illustrated foam products 1000, 1100, 1200, and 1300 are non-limiting and that other shapes, structures, geometries, and the like may be utilized to form a foam product that meets a target size and shape. In some embodiments (e.g., foam product 1300), die cut foam may be combined with die cut corrugate to maximize the rigidity of the corrugate with the compressive strength of the foam for an optimum packaging solution. In the same or other embodiments, the foam may be cut and heat pressed into shape.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A foam precursor, comprising:
    a plurality of granules, wherein individual granules included in the plurality of granules comprise:
        an unmodified starch;
        polybutylene adipate-co-therephthalate (PBAT), wherein a PBAT weight percent representative of the PBAT included in the plurality of granules is from 10% to 40%, wherein a starch weight percent representative of the unmodified starch included in the plurality of granules is greater than the PBAT weight percent; and
        water, wherein a water weight percent representative of the water included in the plurality of granules is 20% or less, wherein the PBAT weight percent is greater than the water weight percent, and wherein a density of the individual granules included in the plurality of granules is from 400 kg/m³ to 1500 kg/m³.

2. The foam precursor of claim 1, wherein the unmodified starch corresponds to pea starch that has not been chemically modified.

3. The foam precursor of claim 1, wherein the plurality of granules consists essentially of the unmodified starch, the PBAT, and the water.

4. The foam precursor of claim 1, wherein the unmodified starch, the PBAT, and the water collectively account for 90% to 100% of a composition of the plurality of granules.

5. The foam precursor of claim 4, further comprising additional materials included in the plurality of granules, wherein an additional materials weight percent representative of the additional materials included in the plurality of granules is less than the water weight percent, wherein the additional materials include all other materials included in the plurality of granules but for the unmodified starch, the PBAT, and the water.

6. The foam precursor of claim 5, wherein the additional materials include at least one of a nucleator, an antioxidant, a lubricant, a plasticizer, or a processing aid.

7. The foam precursor of claim 5, wherein the additional materials weight percent is from 0% to 5%, and wherein the composition of the plurality of granules consists essentially of the unmodified starch, the PBAT, the water, and the additional materials.

8. The foam precursor of claim 5, wherein the additional materials include at least one of a polycaprolactone, polybutylene succinate, polyvinyl alcohol, glycerol monostearate, stearate-based lubricants, silicone-based lubricants, calcium carbonate, talc, glycerol, urea, sorbitol, chitosan, acetic acid, iron oxide pigments, a non-hydrogenated natural wax and metal fatty acid derivative blend, a silane coupling agent, or a heat stabilizer.

9. The foam precursor of claim 1, wherein the water weight percent is from 5% to 20%.

10. The foam precursor of claim 1, further comprising additional materials, wherein an additional materials weight percent representative of the additional materials included in the plurality of granules is greater than 0% but less than 15%, and wherein the additional materials include all other materials included in the plurality of granules but for the unmodified starch, the PBAT, and the water.

11. The foam precursor of claim 10, wherein the additional materials weight percent is less than 5%.

12. The foam precursor of claim 10, wherein the additional materials weight percent is less than 2.5%.

13. The foam precursor of claim 1, wherein the individual granules included in the plurality of granules do not include any other polymers other than the unmodified starch and the PBAT.

14. The foam precursor of claim 1, wherein the individual granules included in the plurality of granules are non-hygroscopic.

15. The foam precursor of claim 1, wherein the individual granules included in the plurality of granules are unfoamed.

16. The foam precursor of claim 1, wherein the plurality of granules is configured to provide a foam exhibiting environmental moisture insensitivity such that a change of compressive strength of the foam between 20% relative humidity and 50% relative humidity is 10% or less.

17. The foam precursor of claim 1, wherein the plurality of granules is configured to provide a foam characterized as having a water contact angle between 80° and 100°.

18. The foam precursor of claim 1, wherein the plurality of granules is configured to provide a foam having a cell density of 2-40 cells/cm².

19. The foam precursor of claim 1, wherein the individual granules included in the plurality of granules have a volume from between 0.1 cm³ to 1 cm³.

20. A method, comprising:
    inputting unmodified starch, polybutylene adipate-co-therephthalate (PBAT), and water into an extruder to form a mixture that propagates through a plurality of temperature-controlled zones of the extruder;

outputting an extrudate from the extruder, the extrudate corresponding to the mixture processed by the extruder; and chopping the extrudate into a plurality of granules, wherein a PBAT weight percent representative of the PBAT included in the plurality of granules is from 10% to 40%, wherein a starch weight percent representative of the unmodified starch included in the plurality of granules is greater than the PBAT weight percent, wherein a water weight percent representative of the water included in the plurality of granules is 20% or less, wherein the PBAT weight percent is greater than the water weight percent, and wherein a density of individual granules included in the plurality of granules extrudate is from 400 kg/m$^3$ to 1500 kg/m$^3$.

21. The method of claim 20, further comprising:

inputting the plurality of granules into the extruder to form a foam precursor blend as the plurality of granules propagate through the plurality of temperature-controlled zones of the extruder, wherein individual granules included in the plurality of granules having a volume from 0.1 cm$^3$ to 1 cm$^3$; and outputting a second extrudate from the extruder, the second extrudate corresponding to the plurality of granules processed by the extruder, wherein a density of the second extrudate is from 10 kg/m$^3$ to 80 kg/m$^3$.

22. The method of claim 21, wherein the mixture is processed within the extruder at a first temperature of 1.2 times to 1.7 times a melting temperature of the PBAT, wherein the plurality of granules is processed by the extruder at a second temperature less than the first temperature, and wherein the second temperature is from 0.7 times to 1.1 times the melting temperature of the PBAT.

* * * * *